(12) United States Patent
Philipp et al.

(10) Patent No.: US 7,821,274 B2
(45) Date of Patent: Oct. 26, 2010

(54) CAPACITIVE POSITION SENSOR

(75) Inventors: Harald Philipp, Southampton (GB); Samuel Brunet, Cowes (GB); Matthew Trend, Fareham (GB); Alan Bowens, Southampton (GB)

(73) Assignee: Atmel Corporation, San Jose, CA (US)

( * ) Notice: Subject to any disclaimer, the term of this patent is extended or adjusted under 35 U.S.C. 154(b) by 140 days.

(21) Appl. No.: 12/114,709

(22) Filed: May 2, 2008

(65) Prior Publication Data

US 2008/0278178 A1 Nov. 13, 2008

Related U.S. Application Data

(60) Provisional application No. 60/916,316, filed on May 7, 2007.

(51) Int. Cl.
*G01R 27/26* (2006.01)
(52) U.S. Cl. ..................... 324/662; 324/658
(58) Field of Classification Search ............... 324/662, 324/661, 658, 649, 600, 688, 686; 341/33; 345/173
See application file for complete search history.

(56) References Cited

U.S. PATENT DOCUMENTS

| | | | | |
|---|---|---|---|---|
| 4,550,221 A | * | 10/1985 | Mabusth | 178/18.06 |
| 4,704,501 A | * | 11/1987 | Taguchi et al. | 345/173 |
| 5,347,132 A | * | 9/1994 | Holzman et al. | 250/389 |
| 5,463,388 A | * | 10/1995 | Boie et al. | 341/33 |
| 5,606,346 A | * | 2/1997 | Kai et al. | 345/173 |
| 6,222,528 B1 | | 4/2001 | Gerpheide | |
| 6,452,514 B1 | * | 9/2002 | Philipp | 341/33 |
| 7,545,289 B2 | * | 6/2009 | Mackey et al. | 341/20 |
| 7,583,092 B2 | * | 9/2009 | Reynolds et al. | 324/688 |
| 2006/0049834 A1 | * | 3/2006 | Umeda | 324/658 |
| 2007/0008299 A1 | | 1/2007 | Hristov | |
| 2007/0062739 A1 | | 3/2007 | Philipp | |
| 2007/0132392 A1 | * | 6/2007 | Jacobsen et al. | 313/583 |
| 2008/0246496 A1 | * | 10/2008 | Hristov et al. | 324/686 |

OTHER PUBLICATIONS

International Search Report (ISR) and Written Opinion of International Searching Authority in corresponding application PCT/GB2008/001425.

* cited by examiner

*Primary Examiner*—Hoai-An D Nguyen
(74) *Attorney, Agent, or Firm*—McDermott Will & Emery LLP

(57) ABSTRACT

A sensor includes a substrate with a sensitive area defined by a pattern of electrodes. The pattern of electrodes includes a first group of drive elements interconnected to form a plurality of row electrodes extending along a first direction, a second group of drive elements interconnected to form a plurality of column electrodes extending along a second direction, and a group of sense elements interconnected to form a sense electrode extending along both the first and second directions. The sensor may be coupled to a controller that includes a drive unit for applying drive signals to the row and column electrodes, and a sense unit for measuring sense signals representing a degree of coupling of the drive signals applied to the row and column electrodes to the sense electrode.

23 Claims, 10 Drawing Sheets

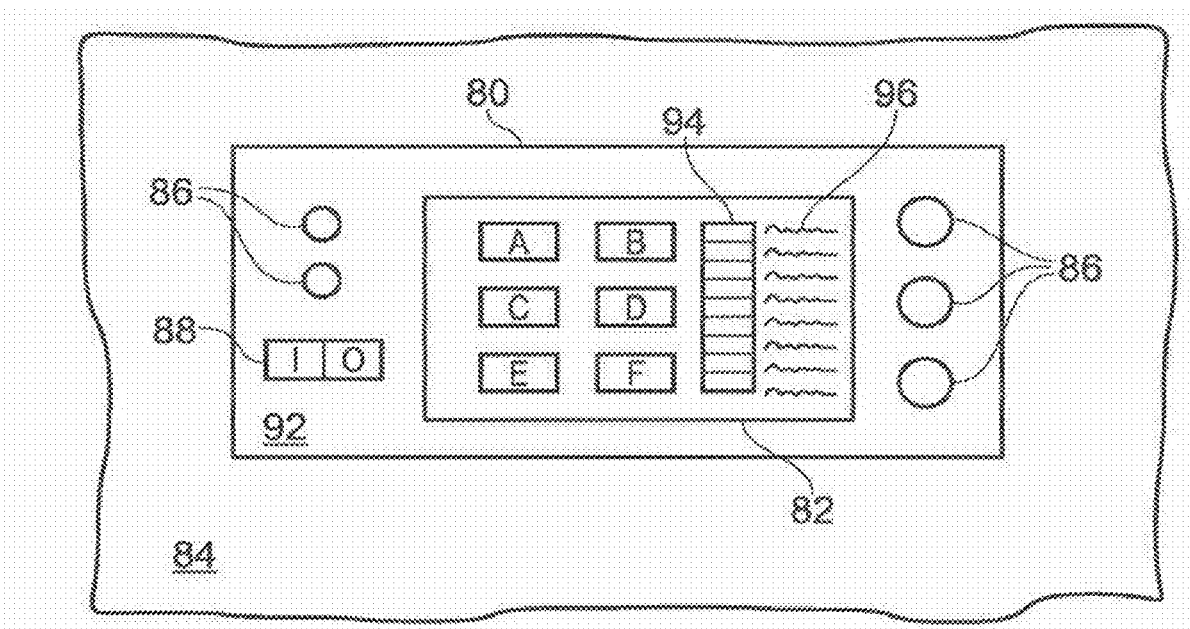
FIG. 9
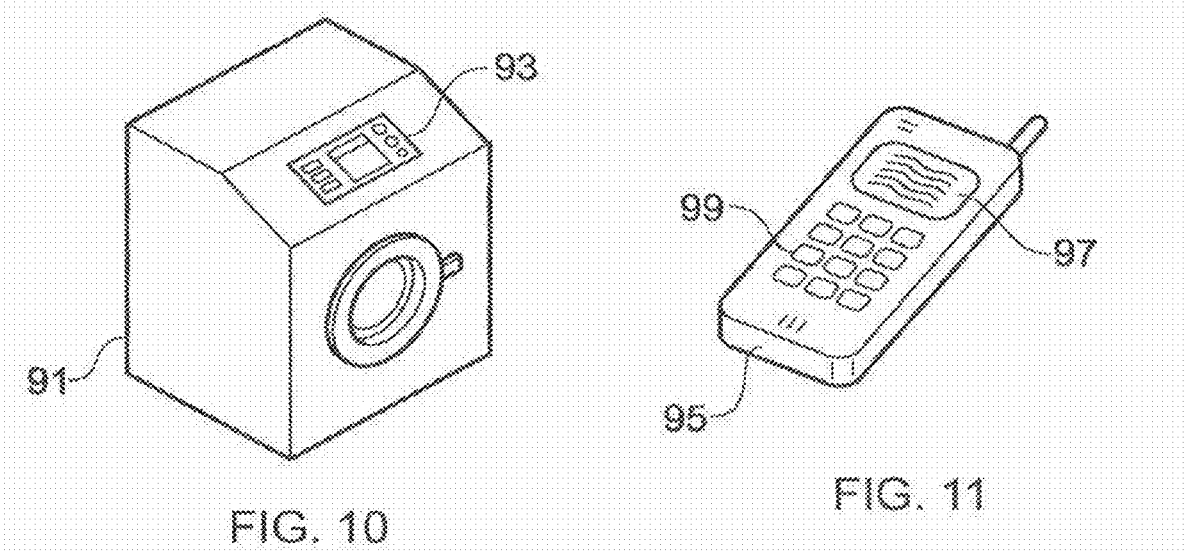
FIG. 10
FIG. 11

CAPACITIVE POSITION SENSOR

BACKGROUND OF THE INVENTION

The invention relates to 2-dimensional position sensors. More particularly the invention relates to 2-dimensional position sensors of the type based on capacitive proximity sensing techniques. Such sensors may be referred to as 2-dimensional capacitive transducing (2DCT) sensors. 2DCT sensors are based on detecting a disturbance in a capacitive coupling of sensor electrodes, either to ground or to another electrode, caused by the proximity of a pointing object. A measured location for the disturbance corresponds to a measured position for the pointing object.

2DCT sensors are typically actuated by a human finger, or a stylus. Example devices include touch screen and touch sensitive keyboards/keypads, e.g. as used for controlling consumer electronic devices/domestic appliances, and possibly in conjunction with an underlying display, such as a liquid crystal display (LCD), or cathode ray tube (CRT). Other devices which may incorporate 2DCT sensors include pen-input tablets and encoders used in machinery for feedback control purposes, for example.

Devices employing 2DCT sensors have become increasingly popular and common, not only in conjunction with personal computers, but also in all manner of other appliances such as personal digital assistants (PDAs), point of sale (POS) terminals, electronic information and ticketing kiosks, kitchen appliances and the like. 2DCT sensors are frequently preferred to mechanical switches for a number of reasons. For example, 2DCT sensors require no moving parts and so are less prone to wear than their mechanical counterparts. 2DCT sensors can also be made in relatively small sizes so that correspondingly small, and tightly packed keypad arrays can be provided. Furthermore, 2DCT sensors can be provided beneath an environmentally sealed outer surface/cover panel. This makes their use in wet environments, or where there is a danger of dirt or fluids entering a device being controlled attractive. Furthermore still, manufacturers often prefer to employ interfaces based on 2DCT sensors in their products because such interfaces are often considered by consumers to be more aesthetically pleasing than conventional mechanical input mechanisms (e.g. push-buttons).

2DCT sensors may be considered to broadly fall into two categories. Namely those based on passive capacitive sensing techniques, and those based on active capacitive sensing techniques.

Passive capacitive sensing devices rely on measuring the capacitance of a sensing electrode to a system reference potential (earth). The principles underlying this technique are described in U.S. Pat. No. 5,730,165, and U.S. Pat. No. 6,466,036, for example. The contents of U.S. Pat. No. 5,730,165 and U.S. Pat. No. 6,466,036 are incorporated herein in their entirety by reference as describing background material to the invention. In broad summary, passive capacitive sensors employ sensing electrodes coupled to capacitance measurement circuits. Each capacitance measurement circuit measures the capacitance (capacitive coupling) of its associated sensing electrode to a system ground. When there is no pointing object near to the sensing electrode, the measured capacitance has a background/quiescent value. This value depends on the geometry and layout of the sensing electrode and the connection leads to it, and so on, as well as the nature and location of neighbouring objects, e.g. the sensing electrodes' proximity to nearby ground planes. When a pointing object, e.g. a user's finger, approaches the sensing electrode, the pointing object appears a virtual ground. This serves to increase the measured capacitance of the sensing electrode to ground. Thus an increase in measured capacitance is taken to indicate the presence of a pointing object.

U.S. Pat. No. 5,730,165 and U.S. Pat. No. 6,466,036 are primarily directed to discrete (single button) measurements, and not to 2D position sensor applications. However the principles described in U.S. Pat. No. 5,730,165 and U.S. Pat. No. 6,466,036 are readily applicable to 2DCT sensors, e.g. by providing electrodes to define either a 2D array of discrete sensing areas, or rows and columns of electrodes in a matrix configuration.

Passive sensing techniques have been found to be very useful and reliable in a number of applications. However, there are some drawbacks. For example, passive 2DCT sensors are strongly sensitive to external ground loading. That is to say, the sensitivity of such sensors can be significantly reduced by the presence of nearby low impedance connections to ground. This can limit their applicability. For example, some types of display screen technology provide for a low-impedance coupling to ground across the visible screen. This means a passive 2DCT overlaying the display screen will often under-perform because the relatively strong coupling to ground through the screen itself reduces the sensitivity of the 2DCT to any additional coupling to ground caused by an approaching pointing object. A similar effect means 2DCT sensors can be relatively sensitive to changes in their environment, e.g., a 2DCT sensor might behave differently according to its location because of differences in capacitive coupling (ground loading) to external objects. 2DCT sensors are also relatively sensitive to environmental conditions, such as temperature, humidity, accumulated dirt and spilt fluids, etc. All of these effect the sensor's reliability and sensitivity. Furthermore, the measurement circuitry associated with passive 2DCT sensing is generally of high input impedance. This makes passive sensors prone to electrical noise pick up, e.g. radio frequency (RF) noise. This can reduce reliability/sensitivity of the sensor and also places constraints on sensor design (e.g. there is limited freedom to use relatively long connection leads/traces between the sensing electrodes and associated circuitry.

Active 2DCT sensors, on the other hand, are less prone to the above-mentioned effects associated with passive 2DCT sensors. Active 2DCT sensors are based on measuring the capacitive coupling between two electrodes (rather than between a single sensing electrode and a system ground). The principles underlying active capacitive sensing techniques are described in U.S. Pat. No. 6,452,514. The contents of U.S. Pat. No. 6,452,514 are incorporated herein by reference in their entirety as describing background material to the invention. In an active-type sensor, one electrode, the so called drive electrode, is supplied with an oscillating drive signal. The degree of capacitive coupling of the drive signal to the sense electrodes is determined by measuring the amount of charge transferred to the sense electrode by the oscillating drive signal. The amount of charge transferred, i.e. the strength of the signal seen at the sense electrode, is a measure of the capacitive coupling between the electrodes. When there is no pointing object near to the electrodes, the measured signal on the sense electrode has a background/quiescent value. However, when a pointing object, e.g. a user's finger, approaches the electrodes (or more particularly approaches near to the region separating the electrodes), the pointing object acts as a virtual ground and sinks some of the drive signal (charge) from the drive electrode. This acts to reduce the strength of the component of the drive signal coupled to the sense electrode. Thus a decrease in measured signal on the sense electrode is taken to indicate the presence of a pointing object.

A 2DCT active sensor described in U.S. Pat. No. 6,452,514 comprises drive electrodes extending in rows on one side of a substrate and sense electrodes extending in columns on the other side of the substrate so as to define an array of N by M touch keys. Each key corresponds to an intersection between a drive electrode and a sense electrode. Thus the array of keys described in U.S. Pat. No. 6,452,514 may be termed a matrixed array with a single drive electrode (i.e. a single conductive element connected to a single drive channel) associated with all keys in a given column and a single sense electrode (i.e. a single conductive element connected to a single sense channel) associated with keys in a given row. This reduces the number of drive and sense channels required since a single drive channel simultaneously drives all of the keys in a given column and a single sense channel senses all of the keys in a given row. The capacitive coupling between the electrodes at the positions of the different keys can be determined by driving the appropriate column and sensing the appropriate row. For example, to determine the capacitive coupling between the electrodes associated with a key at the intersection of column 2 and row 3, the drive signal is applied to the drive electrode of column 2 while the sense channel associated with the sense electrode of row 3 is active. The output from the active sense channel reflects the capacitive coupling between the electrodes associated with the key under investigation. Different keys can be scanned by sequencing through different combinations of drive and sense channels. In one mode the drive electrodes may be driven sequentially while the sense electrodes are all continuously monitored. A signal change on one (or more) of the sense electrodes indicates the presence of a pointing object. The sense electrode on which the change is seen defines position in one dimension, the drive electrode being driven when the change was seen defines position in the other dimension.

U.S. Pat. No. 5,648,642 also discloses a 2DCT sensor based on active capacitive sensing. This sensor operates according to broadly the same basic principles as described in U.S. Pat. No. 6,452,514. The sensor of U.S. Pat. No. 5,648,642 is schematically shown in FIGS. 1A, 1B and 1C. These figures respectively show top, bottom and composite views of the sensor. The sensor 10 comprises a substrate 12 including a set of first conductive traces 14 disposed on a top surface 16 thereof and run in a first direction to comprise column electrodes of the sensor 10. A set of second conductive traces 18 are disposed on a bottom surface 20 thereof and run in an orthogonal second direction to form row electrodes of the sensor array 10. The sets of first and second conductive traces 14 and 18 are alternately in contact with periodic sense pads 22 comprising enlarged areas, shown as diamonds. A 0.254 cm center-to-center diamond-shaped pattern of sense pads disposed along a matrix of 15 rows and 15 columns of conductors is employed. Every other sense pad 22 in each direction in the pad pattern is connected to sets of first and second conductive traces 14 and 18 on the top and bottom surfaces 16 and 20, respectively of substrate 12.

The 2DCT sensor shown in FIGS. 1A to 1C may thus be operated in an active mode in which the columns 14 of connected sense pads 22 shown in FIG. 1A comprise respective drive electrodes, and the rows 18 of connected sense pads 22 shown in FIG. 1B comprise respective sense electrodes. These may be scanned in a sequential manner as described both in U.S. Pat. No. 5,648,642 and also in U.S. Pat. No. 6,452,514.

Thus 2DCT sensors based on active capacitive proximity sensing may provide sensors which in some circumstances can be more reliable than 2DCT passive sensors. Furthermore, a matrix array of drive and sense electrodes, such as shown in FIGS. 1A to 1C, may be employed instead of an array of discrete self-contained drive and sense electrode pairs. This has the advantage of reducing the number of connections required to be made between the electrodes comprising the 2DCT sensor and the associate drive/sense circuitry. This not only makes for simpler wiring logistics, it also reduces cost because fewer drive/sense channels are required, e.g. a 2DCT sensor comprising an array of N×M sensing areas requires N drive channels and M sense channels in a matrix configuration, but (N×M) of each in a discrete sensing area configuration.

When implementing drive and sense channel circuitry of the kind described in U.S. Pat. No. 6,452,514 in an integrated circuit (IC) chip package, each drive channel requires one pin-out while each sense channel requires two pin-outs. Thus, for a 2DCT sensor comprising an array of n×m sensing areas, a matrixed array requires N+2M pin outs (or M+2N pin outs depending on which of the columns and rows are drive or sense electrodes—i.e. which are connected to drive or sense channels). However, a discrete (non-matrixed array) requires 3 NM pin outs. Circuit connections, and in particular pin outs in IC chip implementations, are expensive, both in monetary terms, and in terms of the physical space and complexity required to implement them.

Thus there is a desire to provide a 2DCT sensor based on active capacitive sensing techniques which requires still fewer connections, i.e., requiring still fewer external connections compared to known 2DCT sensors based on matrixed arrays.

SUMMARY OF THE INVENTION

According to a first aspect of the invention there is provided a sensor for determining a position for an adjacent object in two dimensions, the sensor comprising a substrate with a sensitive area defined by a pattern of electrodes, wherein the pattern of electrodes includes a first group of drive elements interconnected to form a plurality of row electrodes extending along a first direction, a second group of drive elements interconnected to form a plurality of column electrodes extending along a second direction, and a group of sense elements interconnected to form a sense electrode extending along both the first and second directions.

By providing drive electrodes in both columns and rows and a sense electrode extending in both directions, a single sense electrode is which is capacitively coupled to both the column and the row electrodes is provided. This means a 2D position sensor based on active capacitive sensing techniques is provided which may be used with only one channel of sense circuitry, and without requiring a multiplexer to do this. Thus the sensor may further comprise a controller comprising a drive unit for applying drive signals to the row and column electrodes, and a sense unit for measuring sense signals representing a degree of coupling of the drive signals applied to the row and column electrodes to the sense electrode. Since sense channels are generally more expensive to implement than drive channels, a cheaper sensor can be provided which may employ a controller implemented in an integrated chip requiring fewer pin-outs than known matrixed active capacitive position sensors having comparable positioning resolution.

The controller may further comprise a processing unit for calculating a position for the object in one direction from an analysis of the sense signals obtained by applying drive signals to different ones of the row electrodes, and calculating a position for the object in another direction from an analysis of the sense signals obtained by applying drive signals to different ones of the column electrodes. The position determination in each axis may include interpolating so that position can be determined to a precision better than the characteristic column and row electrode dimensions.

The first group of drive elements and the second group of drive elements may be located on opposite sides of the substrate. Alternatively, the first group of drive elements and the second group of drive elements may be located on the same side of the substrate.

In examples where the first and second groups of drive elements are located on the same side of the substrate, connections for connecting the first group of drive elements into row electrodes may be made within the sensitive area of the sensor and connections for connecting the second group of drive elements into column electrodes may made at least partially outside of the sensitive area of the sensor (i.e. in a region of the sensor that need not be single layered), for example using conventional jumpers or wires. The connections for connecting the second group of drive elements into column electrodes may include connection portions within the sensitive area of the sensor which extend in the same direction as the row electrodes from respective ones of the drive elements to a periphery of the sensitive area of the sensor. This allows the connections to be fed out of the sensitive area without having to cross the row electrodes.

In one configuration drive elements in at least one of the column electrodes include passageways to allow connections from drive elements in another column electrode to be made to other drive elements in that column electrode. Where some drive elements are divided into two portions by a passageway such as this, the portions of the divided drive elements on either side of the passageways may be connected together by connections made at least partially outside of the sensitive area of the sensor (i.e. in a region of the sensor that need not be single layered), for example using conventional jumpers or wires.

The connections for connecting the portions of drive elements on either side of the passageways may include connection portions within the sensitive area of the sensor which extend in the same direction as the row electrodes to a periphery of the sensitive area of the sensor. This allows the connections to be fed out of the sensitive area without having to cross the rows of drive electrodes.

The group of sense elements may also be located on the same side of the substrate as the first and second groups of drive elements. In which case, connections for connecting the sense elements into the sense electrode may be made at least partially outside of the sensitive area of the sensor. The connections for connecting the sense elements into the sense electrode may include connection portions within the sensitive area of the sensor which extend in the same direction as the row electrodes from respective ones of the sense elements to a periphery of the sensitive area of the sensor. This allows the connections to be fed out of the sensitive area without having to cross the rows of drive electrodes.

At least one of the sense elements may include a passageway to allow connections from drive elements in a column electrode to be made to other drive elements in that column electrode through the passageway. Portions of a sense element on either side of a passageway may be connected together by connections made at least partially outside of the sensitive area of the sensor. The connections for connecting the portions of the sense elements on either side of the passageway may include connection portions within the sensitive area of the sensor which extend in the same direction as the row electrodes to a periphery of the sensitive area of the sensor.

The row electrodes and the column electrodes may be orthogonal to one another.

The electrodes can be made of a transparent material, such as indium tin oxide (ITO), or any other suitable material. The substrate can also be made of a transparent material, such as glass or a transparent plastics material, e.g. a polymethyl methacrylate (PMMA) such as Perspex, or a cycloolefin copolymer (COP) such as Zeon's Zeonex, Ticona's Topas, Mitsui's APE or Japan Synthetic Rubber's Arton, for example. However, in some applications, it may be the case that the electrodes and/or the substrate are opaque.

It will be understood that the row and column directions are defined by an appropriate coordinate system, most commonly an xy Cartesian system in which they are orthogonal, although they may be at a non-orthogonal angle. Moreover, in the following the rows and columns are sometimes referred to as x- or horizontal and y- and vertical respectively for convenience, although this implies no particular alignment to real space, such as relative to the direction of gravity.

According to another aspect of the invention there is provided an apparatus comprising a two-dimensional position sensor according to the first aspect of the invention.

BRIEF DESCRIPTION OF THE DRAWINGS

For a better understanding of the invention and to show how the same may be carried into effect reference is now made by way of example to the accompanying drawings.

FIG. 9 schematically shows a touch sensitive display screen incorporating a sensor according to an embodiment of the invention;

FIG. 10 schematically shows a washing machine incorporating a sensor according to an embodiment of the invention; and FIG. 11 schematically shows a cellular telephone incorporating a sensor according to an embodiment of the invention.

DETAILED DESCRIPTION

Figure 1A:
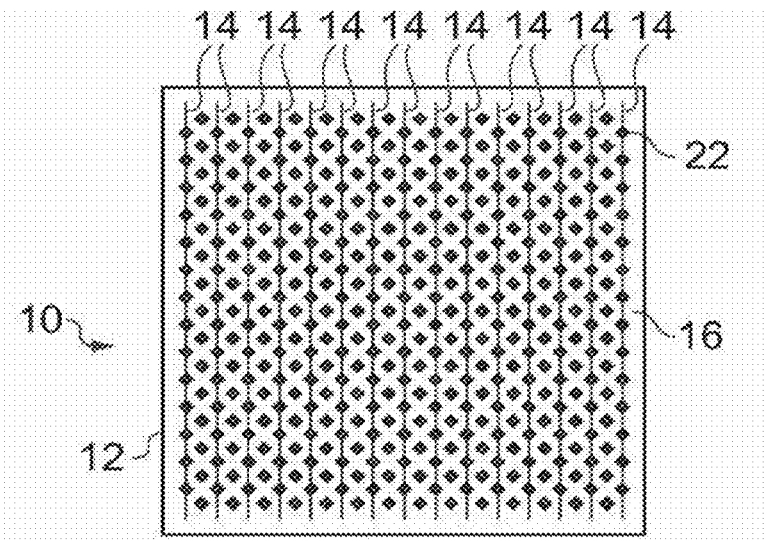
FIG. 1A is a top view of a known object position sensor transducer and shows the object position sensor surface layer including a top conductive trace layer and conductive pads connected to a bottom trace layer.
Figure 1B:
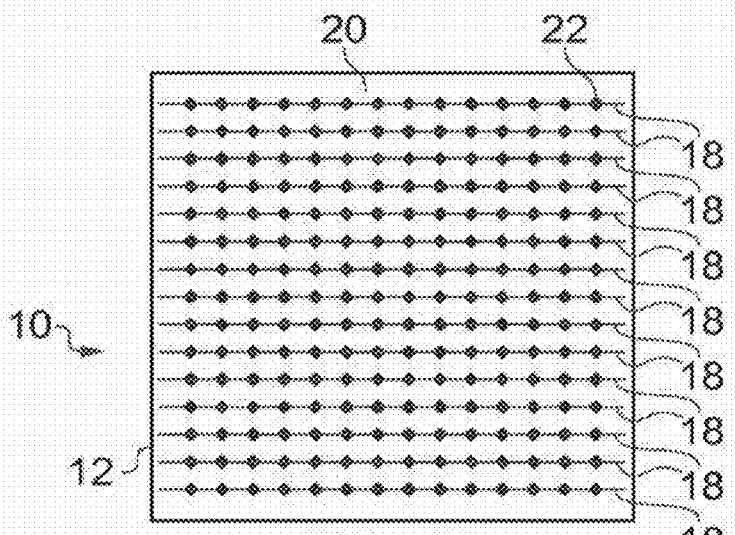
FIG. 1B is a bottom view of the object position sensor transducer of FIG. 1A and shows the bottom conductive trace layer.
Figure 1C:
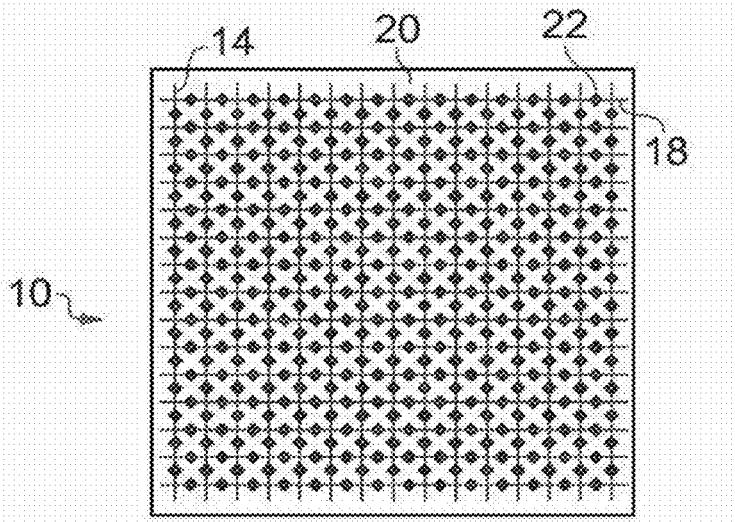
FIG. 1C is a composite view of the object position sensor transducer of FIGS. 1A and 1B and shows both the top and bottom conductive trace layers.
Figure 2:
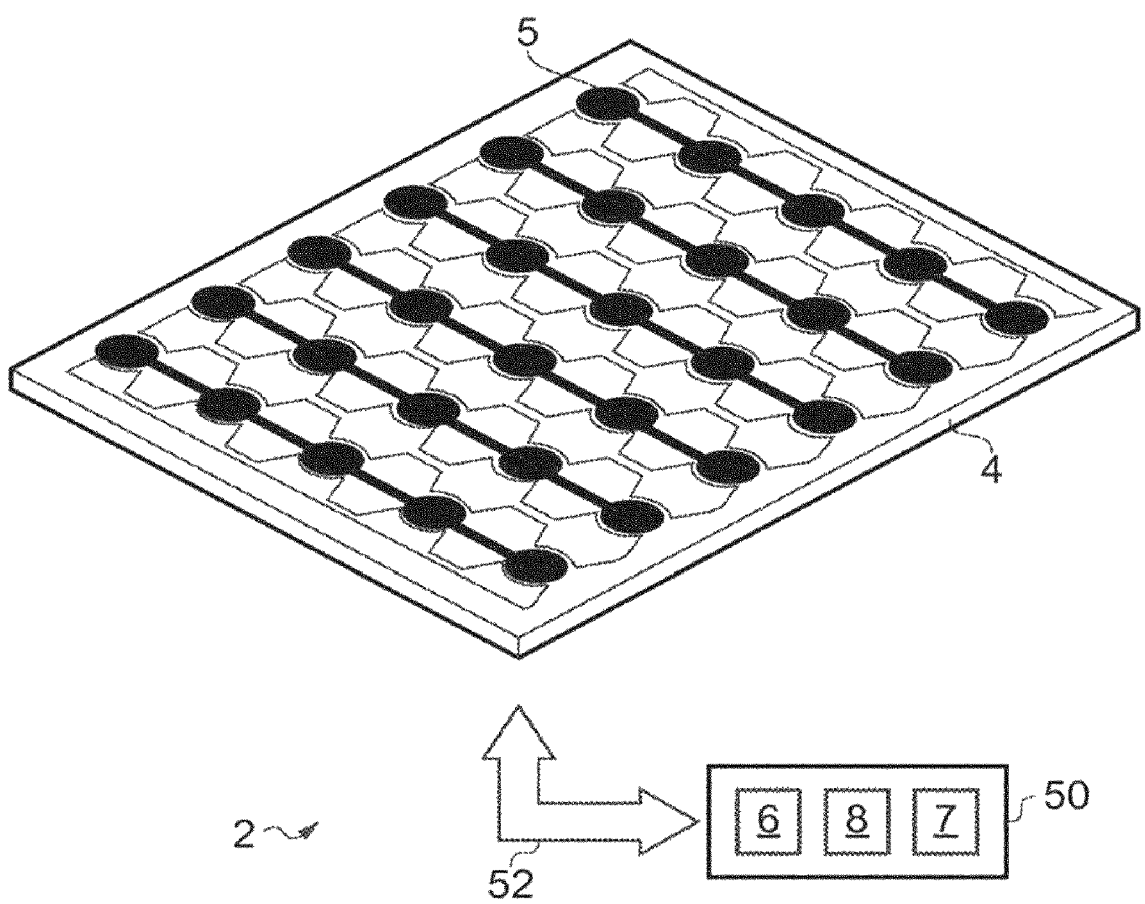
FIG. 2 is a schematic perspective view showing a position sensor according to an embodiment of the invention.
Figure 4:
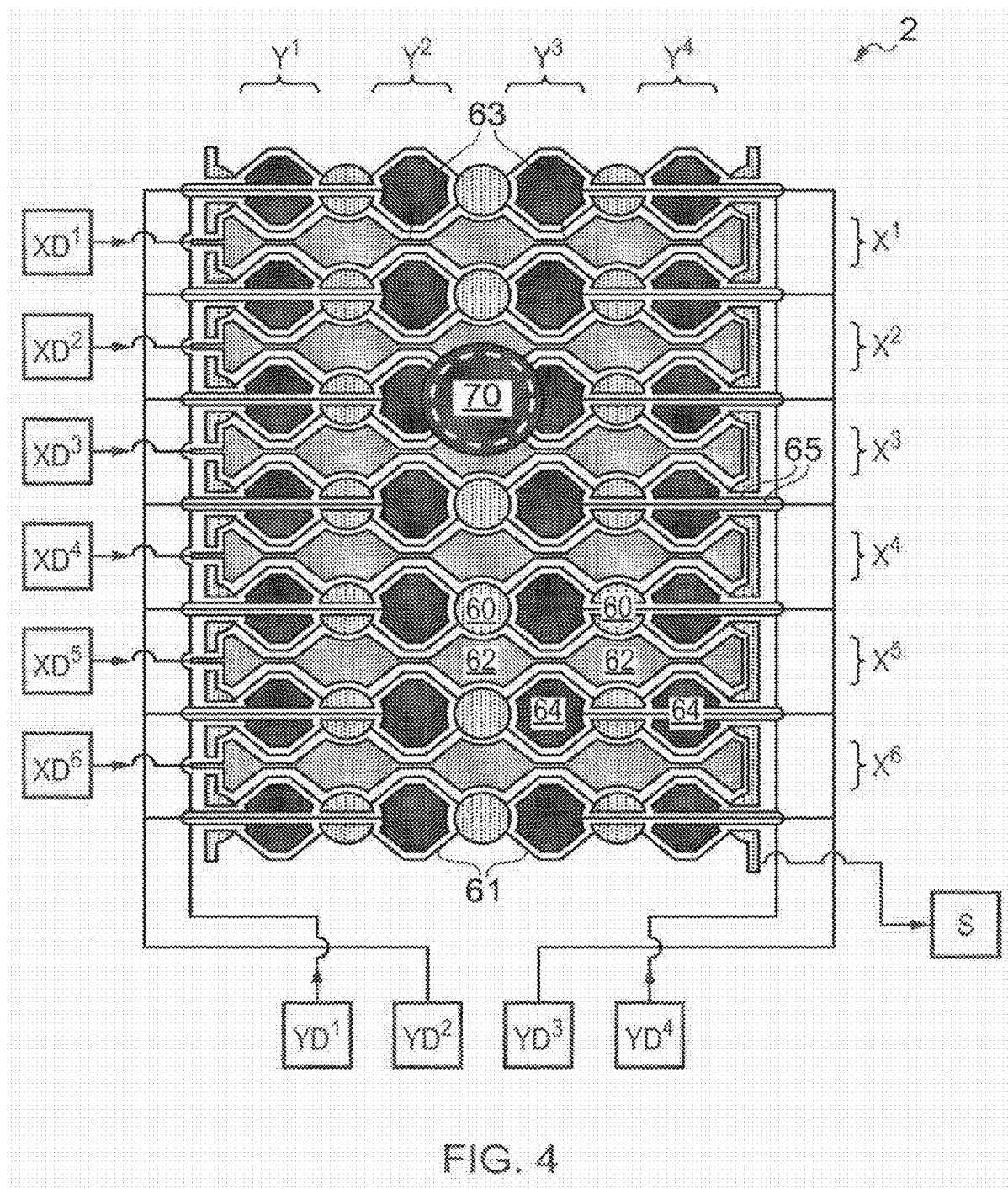
FIG. 4 is a schematic plan view of a position sensor according to another embodiment of the invention.

FIG. 2 is a schematic perspective view showing a position sensor 2 according to an embodiment of the invention. The sensor 2 comprises a substrate 4 bearing an electrode pattern 5 defining a sensitive area of the sensor and a controller 50. The controller is coupled to electrodes within the electrode pattern by a connection 52. In this embodiment the electrode pattern is confined to one side only of the substrate (the upper side for the orientation shown in FIG. 2). In other examples the electrode pattern 5 may be distributed over both sides of the substrate. The electrode pattern 5 in this perspective view is shown highly schematically. A more representative view of the electrode pattern of the sensor of FIG. 2 is shown in FIG. 4, described further below.

The electrode pattern 5 on the substrate 4 can be provided using conventional techniques (e.g. lithography, deposition, or etch techniques). The substrate 4 in this example is of a transparent plastics material, in this case Polyethylene Terephthalate (PET). The electrodes comprising the electrode pattern are of a transparent conductive material, in this case Indium Tin Oxide (ITO). Thus the sensitive area of the sensor as a whole is transparent. This means the sensor may be used over an underlying display without obscuration. However, in other embodiments the sensor might be non-transparent, e.g. comprising a conventional printed circuit board, or other, substrate with a copper electrode pattern, e.g. for use in a mobile telephone keypad.

The controller 50 provides the functionality of a drive unit 6 for supplying drive signals to portions of the electrode pattern 5, a sense unit 8 for sensing signals from other portions of the electrode pattern 5, and a processing unit 7 for calculating a position based on the different sense signals seen for drive signals applied to different portions of the electrode pattern, as described further below. The controller 50 thus controls the operation of the drive and sense units, and the processing of responses from the sense unit 8 in the processing unit 7, in order to determine the position of an object, e.g. a finger or stylus, adjacent the sensor 2. The drive unit 6, sense unit 8 and processing unit 7 are shown schematically in FIG. 2 as separate elements within the controller. However, in general the functionality of all these elements will be provided by a single integrated circuit chip, for example a suitably programmed general purpose microprocessor, or field programmable gate array, or an application specific integrated circuit.

Figure 3A:
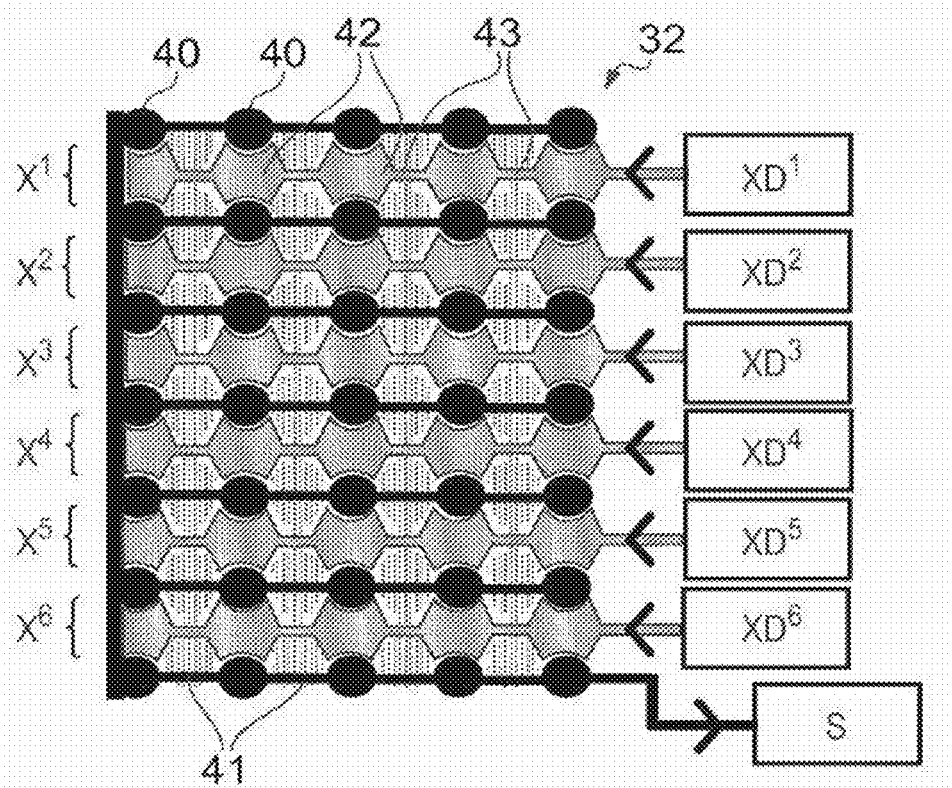
FIG. 3A is a schematic view showing a front side of a position sensor according to an embodiment of the invention and associated drive and sense circuitry.
Figure 3B:
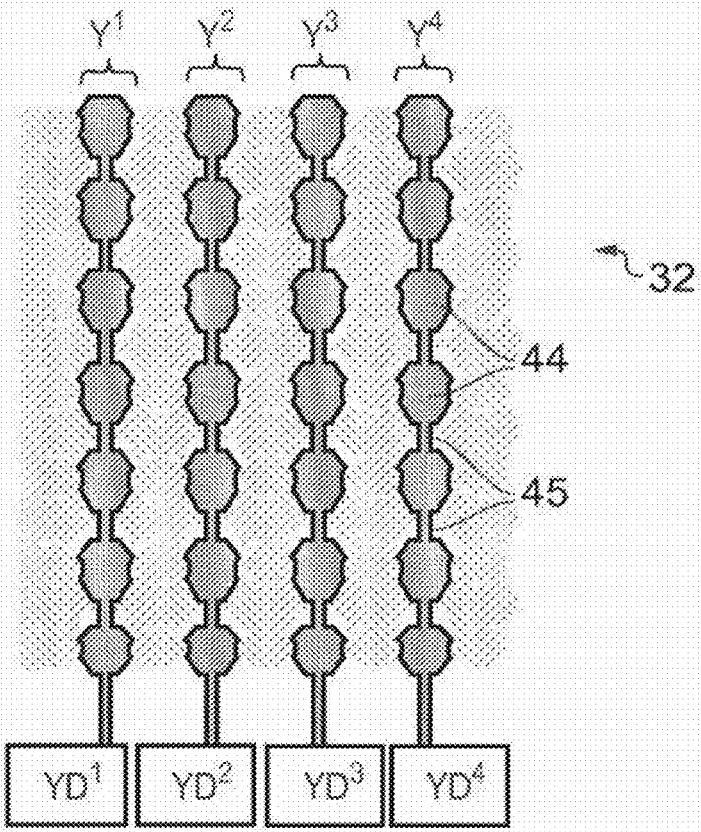
FIG. 3B is a schematic view showing a rear side of the position sensor shown in FIG. 3B with associated drive circuitry.

FIGS. 3A and 3B schematically show respective views of electrode patterning on a front surface and a rear surface of a substrate of a two-dimensional capacitive position sensor 32 according to another embodiment of the invention. The sensor 32 shown in FIGS. 3A and 3B is broadly similar to that shown in FIG. 2. However, it differs in that the electrode patterning is spread over both sides of the sensor substrate. However, this does not significantly effect other aspects of the sensor. Thus the sensor 32 shown in FIGS. 3A and 3B may include a controller which is largely identical to the controller shown in FIG. 2.

It is noted that FIG. 3A is referred to as a front view and FIG. 3B is referred to as a rear view. However, it will be appreciated that the terms "front" and "rear" are used for convenience to refer to opposing sides (faces) of the sensor substrate. The terms are not intended to imply any particular spatial orientation for the sensor or its substrate. The term front will generally be used to identify the side of a sensor which typically faces an object to be sensed when the sensor is in normal use. The term rear will generally be used to identify the opposing face (i.e. the face which typically faces away from an object to be sensed in normal use). Even so, it will be appreciated that in many, if not all, cases the sensor substrate will be fully reversible in that the sensor will operate regardless of which side a pointing object approaches from (i.e. regardless of which side is considered the front side and which side is considered the rear side).

The electrode patterning on the front side of the substrate (FIG. 3A) comprises a plurality of interconnected sense elements 40 (shown black) and a plurality of drive elements 42 (shown medium grey).

The sense elements 40 are generally circular in shape and arranged in a regular 5 by 7 array across the sensor substrate. The sense elements 40 are interconnected by an appropriate arrangement of sense elements connection traces 41 (also shown black in FIG. 3A). This is achieved in this example by directly connecting each sense element to its neighbours in horizontal rows. The horizontal rows of directly connected sense elements are then connected together by a connection trace running down the left-hand side of the electrode patterning shown in FIG. 3A. Thus all of the sense elements are connected together to provide a single sense electrode comprising interconnected sense elements distributed in both dimensions across the 2D sensitive area of the sensor. The sense electrode is coupled via sense electrode wiring to a sense channel S in a sense unit within the controller of the sensor (e.g. a controller such as shown in FIG. 2). The sense channel S is controlled by the controller to determine an amount charge coupled into the interconnected group of sense elements, as described further below.

The drive elements 42 on the side of the substrate shown in FIG. 3A are arranged in a regular 5 by 6 array across the sensor substrate. Respective ones of the drive elements are located adjacent to and between respective ones of the sense elements 40. This arrangement thus provides columns of alternating sense and drive elements. The drive elements and the sense elements are closely spaced apart from one another. The drive elements 42 are generally hexagonal (non-regular in this example), but with inwardly curved edges on sides adjacent the sense elements 40 to accommodate the circular shape of the sense elements. The drive elements in each row are connected together by an appropriate arrangement of drive elements connection traces 43 (also shown medium grey in FIG. 3A)

Thus the plurality of drive elements 42 on the side of the sensor substrate shown in FIG. 3A may be considered as being arranged into six row electrodes $X^1, X^2, X^3, X^4, X^5$, and $X^6$. For the orientation shown in FIG. 3A, these row electrodes run horizontally and are spaced apart from each other vertically. (The terms vertical and horizontal, top and bottom, and so on, will generally be used herein to refer to the orientations of sensors as shown in the drawings, unless the context demands otherwise. It will be appreciated that the terms are not intended to refer to any particular orientation for a sensor when it is in normal use. Furthermore, it will be appreciated the terms column and row are used merely as labels to allow ready distinction between two different arbitrary directions, in this case between a vertical and a horizontal direction, but in general the rows and columns need not be orthogonal.

Each row of drive elements (i.e. each row electrode) is coupled via row drive wiring to a respective drive channel $XD^1$, $XD^2$, $XD^3$, $XD^4$, $XD^5$ and $XD^6$ within the drive unit of the controller of the sensor. In this example a separate drive channel is provided for each row electrode. However, a single drive channel with appropriate multiplexing may also be used. The drive channels are controlled by the controller to apply drive signals to respective ones of the rows of drive elements (row electrodes) as described further below.

The electrode patterning of the rear side of the substrate (FIG. 3B) comprises a further plurality of drive elements 44 (again shown as medium grey in the figure). These drive elements 44 are arranged in a regular 4 by 7 array across the sensor substrate. The location of the drive elements 44 on this side of the substrate relative to the electrode patterning on the face of the substrate shown in FIG. 3A can be seen in FIG. 3B from the light grey representation of the electrode patterning shown in FIG. 3A. Thus the drive elements 44 on the rear of the substrate are located (in projected plan view) between the sense elements 40 so as to provide rows of alternating sense and drive elements. The drive elements 44 and the sense elements (in projection) do not overlap. The drive elements 44 are generally hexagonal, but with inwardly curved cutaways at corners adjacent to the projection of the sense elements 40 onto the rear side of the substrate to accommodate the circular shape of the sense elements without overlapping. The drive elements 44 in each column are connected together by an appropriate arrangement of drive elements column connection traces 45 (also shown medium grey in FIG. 3A).

Thus the plurality of drive elements 44 on the rear side of the sensor substrate shown in FIG. 3B may be considered as being arranged into four column electrodes $Y^1$, $Y^2$, $Y^3$ and $Y^4$. These column electrodes run vertically and are spaced apart from each other horizontally for the orientation shown in FIG. 3B.

Each column of drive elements 44 is coupled via column drive wiring to a respective drive channel $YD^1$, $YD^2$, $YD^3$ and $YD^4$ within the sensor controller. These drive channels may be identical to the drive channels $XD^1$, $XD^2$, $XD^3$, $XD^4$, $XD^5$ and $XD^6$ coupled to the row electrodes. In this example a separate drive channel is provided for each column electrode. However, a single drive channel with appropriate multiplexing may also be used. The drive channels are controlled by the controller to apply drive signals to respective ones of the columns of drive elements 44 as described further below. (A single drive channel with appropriate multiplexing may provide the functionality of all drive channels $XD^1$, $XD^2$, $XD^3$, $XD^4$, $XD^5$, $XD^6$, $YD^1$, $YD^2$, $YD^3$ and $YD^4$.)

Figure 3C:
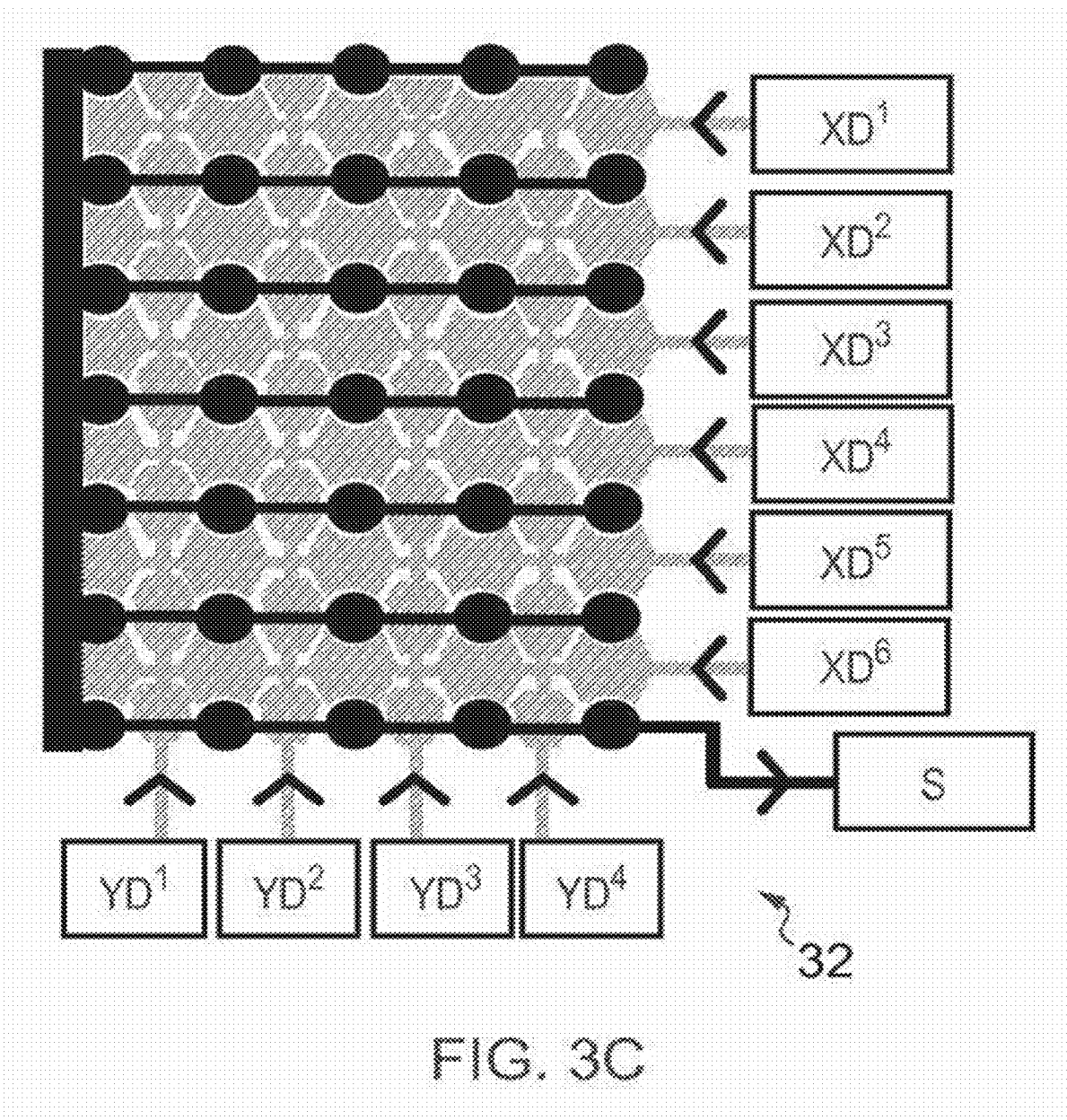
FIG. 3C is a schematic view showing a composite view of both sides of the position sensor shown in FIGS. 3A and 3B and associated drive and sense circuitry.

FIG. 3C schematically shows a front plan view of the sensor 32 shown in FIGS. 3A and 3B in which the electrode patterning on both the front side (FIG. 3A) and the rear side (FIG. 3B) are shown together.

Thus the sensor 32 comprises a plurality of driven row electrodes, a plurality of driven column electrodes, and a single sense electrode comprising a network of interconnected sense elements interspersed among the driven row and column electrodes across the sensitive area of the sensor. Each neighbouring pairing of a drive element 42, 44 and a sense element 40 (as seen in projection, i.e. regardless of whether the drive and sense element are on the same side of the substrate) can be considered to correspond to a discrete sensor area which may be operated according to the techniques described in U.S. Pat. No. 6,452,514. The manner of operation for the sensor 32 shown in FIGS. 3A to 3C is similar to and will be understood from the below description of the manner of operating the sensor 2 shown in FIG. 2.

FIG. 4 schematically shows a plan view of the sensor 2 shown in FIG. 2. As previously noted, this sensor is similar to that shown in FIGS. 3A to 3C, and differs only in that the electrode patterning of the sensor 2 shown in FIG. 4 is confined to one side of the substrate only. Thus the sensor may be referred to as a single sided substrate. This has the advantage of being cheaper to manufacturer since only a single layer of electrode patterning needs to be processed.

Aspects of the sensor 2 which are similar to and will be understood from the above description of the sensor 32 shown in FIGS. 3A to 3C are identified by the same reference symbols. Apart from being single-sided, the electrode pattern shown in FIG. 4 includes the same basic elements as the electrode pattern in FIG. 3C. However, some of these elements are modified to allow the routing of connections between the various sense and drive elements within a single layer of conductive material (electrodes) within the sensitive area of the sensor.

Thus electrode patterning on the substrate shown in FIG. 4 comprises a plurality of interconnected sense elements 60 (shown light grey), a plurality of drive elements 62 connected to form row electrodes (shown medium grey), and a plurality of drive elements 64 connected to form column electrodes (shown black).

The sense elements 60 are generally circular in shape, except for those at the left and right edge of the sensitive area which in this example are semi-circular, although this is not significant. The sense elements are again arranged in a regular 5 by 7 array across the sensor substrate. The sense elements 60 are interconnected by an appropriate arrangement of sense element connection traces 61 (also shown light grey in FIG. 4). Thus all of the sense elements are connected together to provide a single sense electrode comprising interconnected sense elements distributed in both dimensions across the 2D sensitive area of the sensor. The sense electrode is coupled via sense electrode wiring to a sense channel S in the sense unit 8 within the controller 50 of the sensor 2. The sense channel S is operable to determine an amount charge coupled into the interconnected group of sense elements 60 from respective ones of the driven row/column electrodes, as described further below.

The drive elements 62 in the single sided sensor corresponding to the row drive elements 42 of the double sided sensor shown in FIGS. 3A to 3C are arranged in a regular 5 by 6 array across the sensor substrate. Respective ones of the drive elements 62 are located adjacent to and between respective ones of the sense elements 60. This arrangement thus provides columns of alternating sense and drive elements. As before, the drive elements and the sense elements are closely spaced apart from one another but are not connected. The drive elements 62 are again generally hexagonal, except for those at the left and right edges of the sensitive area which in this example are semi-hexagonal, although this is not significant, but with inwardly curved edges on sides adjacent the sense elements 60 to accommodate the circular shape of the sense elements. The drive elements in each row are connected together by an appropriate arrangement of row drive element connection traces 63 (also shown medium grey in FIG. 4)

Thus the plurality of drive elements 62 shown in medium grey in FIG. 4 may be considered as being arranged into six row electrodes $X^1$, $X^2$, $X^3$, $X^4$, $X^5$, and $X^6$. Each row of drive elements 62 (i.e. each row electrode) is coupled via row drive wiring to a respective drive channel $XD^1$, $XD^2$, $XD^3$, $XD^4$, $XD^5$ and $XD^6$ within the drive unit 6 of the controller 50 of the sensor. These drive channels are the same as, and will be understood from, the correspondingly labelled drive channels of FIG. 3A. It is noted that in the embodiment shown in FIG. 4 the row drive channels $XD^1$, $XD^2$, $XD^3$, $XD^4$, $XD^5$ and $XD^6$ connect to their respective row electrodes $X^1$, $X^2$, $X^3$, $X^4$, $X^5$, and $X^6$ from the left-hand side of the sensor 2 for the orientation shown in FIG. 4, whereas the corresponding drive channels for the sensor 32 shown in FIG. 3C connect in from the right. However, this is not significant.

The drive elements 64 in the single sided sensor corresponding to the column drive elements 44 of the double sided sensor shown in FIGS. 3A to 3C. These drive elements 64 are thus again arranged in a regular 4 by 7 array across the sensor substrate. Respective ones of the drive elements 64 are located between respective ones of the sense elements 60 so as to provide rows of alternating sense and drive elements. The drive elements 64 and the sense elements 60 do not contact one another, but are closely spaced. The drive elements 64 are generally hexagonal, but with inwardly curved cut-aways at corners adjacent to the sense elements 60 to accommodate the circular shape of the sense elements. The drive elements 64 in each column are connected together by an appropriate arrangement of drive elements column connection traces 65 (also shown black in FIG. 4).

Thus the plurality of drive elements 64 may be considered as being arranged into four column electrodes $Y^1$, $Y^2$, $Y^3$ and $Y^4$. Each column of drive elements 64 is coupled via column drive wiring to a respective drive channel $YD^1$, $YD^2$, $YD^3$ and $YD^4$ within the sensor controller. These drive channels may be identical to the drive channels $XD^1$, $XD^2$, $XD^3$, $XD^4$, $XD^5$ and $XD^6$ coupled to the row electrodes. These drive channels are the same as, and will be understood from, the correspondingly labelled drive channels of FIG. 3B.

Because the sense elements 60, the drive elements connected to form the row electrodes (which elements may thus be referred to as row drive elements 62), and the drive elements connected to form the column electrodes (column drive elements 64) are all located on one side of the substrate, a different layout of connections between the drive and sense elements is required. This is because to maintain only a single layer of electrode patterning there can be no cross-overs for the connection traces within the sensitive area. This presents a different topological question compared to cases where the electrode pattern is distributed on both sides of the substrate.

Thus, the row drive element connection traces 63 extend directly between neighbouring row drive elements 62 to connect them into rows in the same way as for the two-sided sensor shown in FIG. 3A. The row drive wiring for connecting the row electrodes to their respective drive channels connects the left-most row drive element in each row to the corresponding drive channel in any conventional manner, e.g. by surface mounted connections or flying lead connections.

However, whereas for the sensor 32 shown in FIG. 3A the sense elements are directly connected to their neighbours in horizontal rows, this is not done for the sensor 2 shown in FIG. 4 because the column drive elements 64 are in the way of such connections. Furthermore, some of the generally circular sense elements 60 of the sensor shown in FIG. 4 are divided by a row-aligned passageway into two portions. The passageways in the sensor elements are for allowing connections to the column drive elements 64 to be passed through to an edge of the sensor substrate/sensitive area so that they can be connected to other drive elements in their respective columns as described further below. Thus the sense elements located between column drive elements in column electrodes $Y^2$ and $Y^3$ need not be provided with a passageway. The sense elements located between column drive elements in column electrodes $Y^1$ and $Y^2$ are provided with a passageway sufficiently wide for a single connection trace to the column drive element in column electrode $Y^2$ to pass through. (Likewise, the sense elements located between column drive elements in column electrodes $Y^3$ and $Y^4$ are provided with a passageway sufficiently wide for a single connection trace to the column drive element in column electrode $Y^3$ to pass through.) The sense elements located at the left-hand edge of the sensitive area are provided with a passageway sufficiently wide for three connection traces to pass through. Namely a first connection trace to the column drive element in column electrode $Y^2$, and second and third traces to respective first and second portions of the drive elements in column $Y^1$, these drive elements also being split by a passageway for allowing the connection trace to the drive elements in column electrode $Y^2$ to pass out to the edge of the sensitive area. The sense elements located at the right-hand edge of the sensitive area are similarly provided with passageways sufficiently wide for three connection traces to pass through.

The sense elements are thus connected in rows to their neighbouring sense elements by sense element connection traces which run in the gaps between the drive elements of the row drive electrodes and the column drive electrodes. Each sense element is thus connected to each of its row-neighbours by two sections of connection trace, one connecting the upper halves of each neighbouring sense element and one connecting the lower halves. By using two sections of connection trace per neighbouring pair of electrodes, those electrodes split by a passageway can be properly interconnected so as to form the single sense electrode. Connections between the lower portions of one row of sense elements and the upper portions of an adjacent row of sense elements are made at the right hand edge of the sensitive area. Thus all sense elements are connected together. The different rows of sense elements are connected by the connection traces made down the right hand side of the sensitive area and the upper and lower portions of the sensor areas in each row having a passageway are connected by the non-split central sensor element in each row of sensor elements.

Furthermore, whereas for the sensor 32 shown in FIG. 3B the column drive elements are directly connected to their neighbours in columns, this is not done for the sensor 2 shown in FIG. 4 because the connected rows of row drive elements and the connected rows of sense elements block such a direct connection. Accordingly the column drive elements 64 are connected into columns by column drive connection traces 65 which comprise portions within the sensitive area of the sensor which run parallel to the row alignment and by portions outside of the sensing area, e.g. made by conventional jumpers or flying leads. Furthermore, and similarly to some of the sensor areas, some of the column drive elements 64 of the sensor shown in FIG. 4 are divided by a row-aligned passageway into two portions. The passageways in the column drive elements are for allowing connections to column drive elements 64 in column electrodes nearer to the centre of the sensitive area to be passed through to an edge of the sensor substrate/sensitive area so that they can be connected to other drive elements in their respective columns as described further below. Thus the column drive elements in column electrodes $Y^2$ and $Y^3$ need not be provided with a passageway. However, the column drive elements in column electrode $Y^1$ are provided with a passageway sufficiently wide for a single connection trace to the column drive element in column electrode $Y^2$ to pass through. (Likewise, the column drive elements in column electrode $Y^4$ are provided with a passageway sufficiently wide for a single connection trace to the column drive elements in column electrode $Y^3$ to pass through.)

The column drive elements in the inner column electrodes $Y^2$ and $Y^3$ are thus connected to their neighbouring elements in the same column by connection traces within the electrode patterning on the sensor substrate which pass parallel to the rows and through the passageways of the sensor elements and the drive elements in the outer column electrodes to the edge of the sensor. The drive elements can then be connected to one another using conventional flying wiring or jumpers outside of the sensitive area.

The upper and lower portions of the column drive elements in the outer column electrodes $Y^1$ and $Y^4$ are connected to each other by connection traces within the electrode patterning on the sensor substrate which pass parallel to the rows and through the passageways of the outer sensor elements. The two portions of the drive elements can then be connected to one another using conventional flying wiring or jumpers outside of the sensitive area. Furthermore, because there is a connection trace to both the upper and lower portions of each column drive element in the outer column electrodes passed out to the edge of the sensitive area, the column drive elements in the outer column electrodes $Y^1$ and $Y^4$ may be connected to their neighbouring elements in the same column by connection traces made outside of the single layer sensitive area using any appropriate connections (i.e. not limited to single layer).

Thus for the electrode patterning shown in FIG. 4, all cross over points for the wiring/connection traces are made outside of the sensitive area, e.g. using any appropriate combination of surface mounted traces and jumpers/flying leads or any other known connection technique. Accordingly, the column electrodes, drive electrodes and sense electrode defining the sensitive area of the sensor can all be provided with only a single layer electrode pattern.

The column drive element connection traces should be of such a thickness that they present a relatively low resistance, but should be not so thick as to comprise a significant area from which drive signals may be coupled to the sense electrodes. Thus for a characteristically typical sized sensor for a hand-held device application, e.g. on the order of 5-10 cm by 5-10 cm, the individual drive and sense elements might have a characteristic size on the order of a few mm to a cm or so, and the width of the column drive element connection traces might be on the order of a few hundred microns for example. However, the most appropriate trace width will depend on the materials used and the specific pattern employed. For example, copper traces can in general be thinner than ITO traces because copper has a lower resistivity than ITO. Furthermore, it will be understood that sensors according to embodiments of the invention are inherently scaleable and smaller or larger sensors may be used.

A manner of operating the sensor 2 shown in FIGS. 2 and 4 will now be described. Referring to FIG. 4, it is assumed that a pointing object, in this case a user's finger, is adjacent the sensor at the location indicated in FIG. 4 by the user's finger print outline 70.

In use, the position of an object is determined in a measurement acquisition cycle in which the column and row electrodes are sequentially driven by their respective drive channels and the amount of charge transferred to the sense electrode from each driven row and column electrode is determined by the sense channel.

Figure 5A:
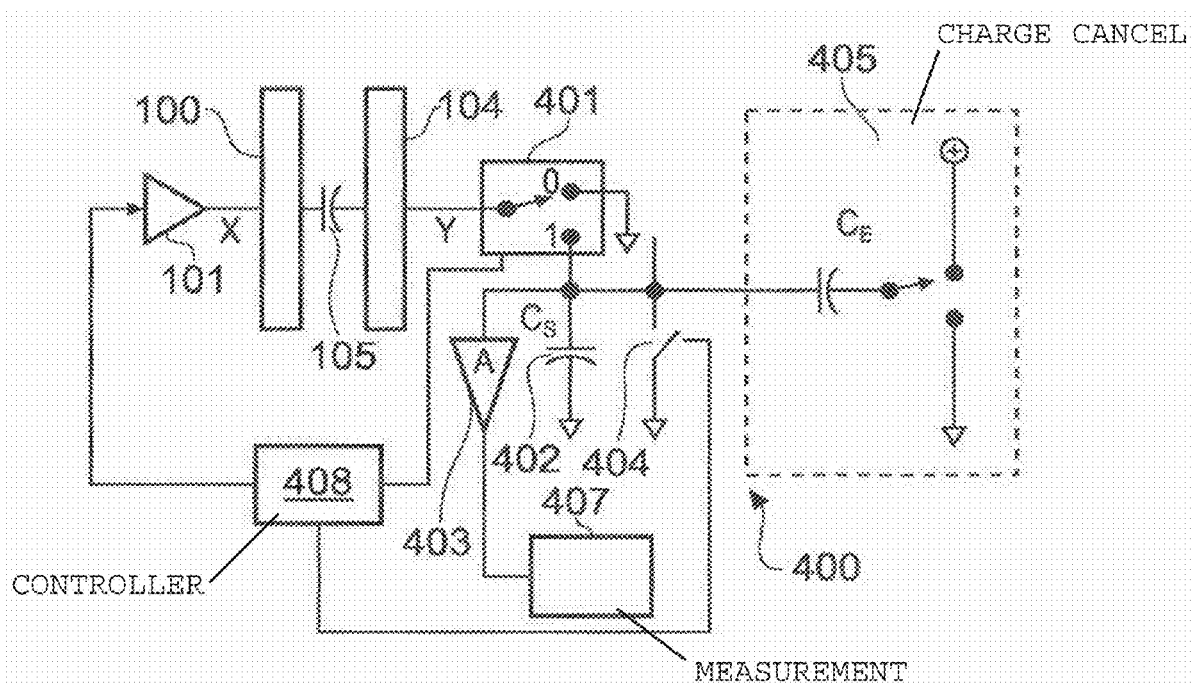
FIG. 5A schematically shows an electrical circuit for use with sensors according to embodiments of the invention.

FIG. 5A schematically shows a circuit which may be used to measure the charge transferred from a driven one of the drive electrodes (which may be any of the row or column electrodes of the sensor shown in FIGS. 2 and 4) to the sense electrode. The drive electrode which is being driven at a given time and the sense electrode have a self (mutual) capacitance. This is determined primarily by their geometries, particularly in the regions where they are at their closest. Thus the driven drive electrode is schematically shown as a first plate 100 of a capacitor 105 and the sense electrode is schematically shown as a second plate 104 of the capacitor 105. Circuitry of the type shown in FIG. 5A is more fully described in U.S. Pat. No. 6,452,514. The circuit is based in part on the charge-transfer ("QT") apparatus and methods disclosed in U.S. Pat. No. 5,730,165, the contents of which are, as noted above, herein incorporated by reference.

Figure 5B:
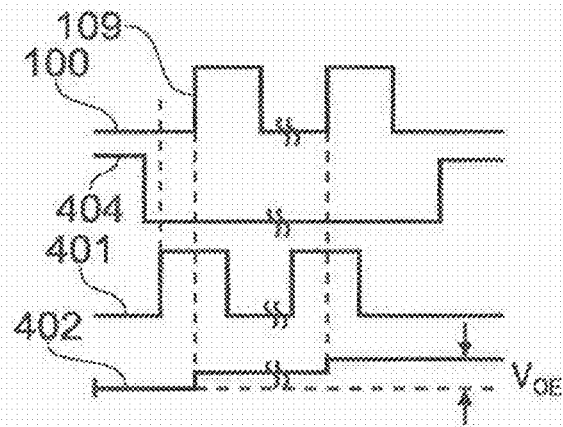
FIG. 5B schematically shows the timing relationship between some elements of the circuit shown in FIG. 6A.

The drive channel associated with the presently driven electrode 100, the sense channel associated with sense electrode 104 and elements of the sensor controller are shown as combined processing circuitry 400 in FIG. 5A. The processing circuitry 400 comprises a sampling switch 401, a charge integrator 402 (shown here as a simple capacitor), an amplifier 403 and a reset switch 404, and may also comprise optional charge cancellation means 405. The timing relationships between the driven electrode drive signal from the drive channel 101 and the sample timing of switch 401 is schematically shown in FIG. 5B. The drive channel 101 and the sampling switch 401 are provided with a suitable synchronizing means, which may be a microprocessor or other digital controller 408, to maintain this relationship. In the implementation shown, the reset switch 404 is initially closed in order to reset the charge integrator 402 to a known initial state (e.g., zero volts). The reset switch 404 is then opened, and at some time thereafter the sampling switch 401 is connected to charge integrator 402 via terminal 1 of the switch for an interval during which the drive channel 101 emits a positive transition, and thereafter reconnects to terminal 0, which is an electrical ground or other suitable reference potential. The drive channel 101 then returns to ground, and the process repeats again for a total of 'n' cycles, (where n may be 1 (i.e. 0 repeats), 2 (1 repeat), 3 (2 repeats) and so on). It can be helpful if the drive signal does not return to ground before the charge integrator is disconnected from the sense electrode since otherwise an equal and opposite charge would flow into/out of the sense channel during positive and negative going edges, thus leading to no net transfer or charge into the charge detector. Following the desired number of cycles, the sampling switch 401 is held at position 0 while the voltage on the charge integrator 402 is measured by a measurement means 407, which may comprise an amplifier, ADC or other circuitry as may be appropriate to the application at hand. After the measurement is taken, the reset switch 404 is closed again, and the cycle is restarted, though with the next drive channel and driven electrode in sequence replacing the drive channel 101 and driven electrode 100 schematically shown in FIG. 5A. The process of making a measurement for a given driven electrode is referred to here as being a measurement 'burst' of length 'n'. where 'n' can range from 1 to any finite number. The circuit's sensitivity is directly related to 'n' and inversely to the value of the charge integrator 402.

It will be understood that the circuit element designated as 402 provides a charge integration function that may also be accomplished by other means, and that this type of circuit is not limited to the use of a ground-referenced capacitor as shown by 402. It should also be self-evident that the charge integrator 402 can be an operational amplifier based integrator to integrate the charge flowing through in the sense circuitry. Such integrators also use capacitors to store the charge. It may be noted that although integrators add circuit complexity they provide a more ideal summing-junction load for the sense currents and more dynamic range. If a slow speed integrator is employed, it may be necessary to use a separate capacitor in the position of 402 to temporarily store the charge at high speed until the integrator can absorb it in due time, but the value of such a capacitor becomes relatively non-critical compared to the value of the integration capacitor incorporated into the operational amplifier based integrator.

It can be helpful for the sampling switch 401 to connect the sense electrode of the sensor to ground when not connected to the charge integrator 402 during the changes of drive signal of the chosen polarity (in this case positive going). This is because this can create an artificial ground plane, thus reducing RF emissions, and also, as noted above, permitting the coupled charge of opposite polarity to that being sensed by the charge integrator 402 to properly dissipate and neutralize. It is also possible to use a resistor to ground on the sense electrode to accomplish the same effect between transitions of drive channels 101. As an alternative to a single SPDT switch 401, two independent switches can be used if timed in an appropriate manner.

As described in U.S. Pat. No. 5,730,165, there are many signal processing options possible for the manipulation and determination of a detection or measurement of signal amplitude. U.S. Pat. No. 5,730,165 also describes the gain relationship of the arrangement depicted in FIG. 5A, albeit in terms of a single electrode system. The gain relationship in the present case is the same. The utility of a signal cancellation means 405 is described in U.S. Pat. No. 4,879,461, as well as in U.S. Pat. No. 5,730,165. The disclosure of U.S. Pat. No. 4,879,461 is herein incorporated by reference. The purpose of signal cancellation is to reduce the voltage (i.e. charge) build-up on the charge integrator 402 concurrently with the generation of each burst (positive going transition of the drive channel), so as to permit a higher coupling between the driven electrodes and the receiving sense electrodes. One benefit of this approach is to allow a large sensing area that is sensitive to small deviations in coupling between the electrodes at relatively low cost. Such large sense couplings are present in physically relatively large electrodes such as might be used in human touch sensing pads. Charge cancellation permits measurement of the amount of coupling with greater linearity, because linearity is dependent on the ability of the coupled charge from the driven electrode 100 to the sense electrode 104 to be sunk into a 'virtual ground' node over the course of a burst. If the voltage on the charge integrator 402 were allowed to rise appreciably during the course of a burst, the voltage would rise in inverse exponential fashion. This exponential component has a deleterious effect on linearity and hence on available dynamic range.

FIGS. 5A and 5B show only one example of circuitry which may be used in embodiments of the invention. Any other known circuitry used in active electrode capacitance measurement circuitry could equally be used, for example circuitry such as described in U.S. Pat. No. 5,648,642. In principle the sense circuitry could be something as simple as a current meter configured to measure the root mean square (RMS) current (e.g. a voltmeter configured to measure an RMS voltage drop across a resistance) of the signal coupled to the sense electrode from the driven electrode.

To summarise the operation of the circuitry shown in FIGS. 5A and 5B, when activated, the current drive channel (which will be one of $XD^1$, $XD^2$, $XD^3$, $XD^4$, $XD^5$, $XD^6$, $YD^7$, $YD^2$, $YD^3$ or $YD^4$ depending on position in the measurement sequence) applies a time-varying drive signal to the associated column/row electrode (which will be one of $X^1$, $X^2$, $X^3$, $X^4$, $X^5$, $X^6$, $Y^1$, $Y^2$, $Y^3$ or $Y^4$). Here it will be assumed that the drive channel is $XD^1$, and thus the driven electrode is $X^1$. The drive channel $XD^1$ may be a simple CMOS logic gate powered from a conventionally regulated supply and controlled by the sensor controller 50 to provide a periodic plurality of voltage pulses of a selected duration (or in a simple implementation a single transition from low-to-high or high-to-low voltage, i.e. a burst of one pulse). Alternatively, the drive channel $XD^1$ may comprise a sinusoidal generator or generator of a cyclical voltage having another suitable waveform. A changing electric field is thus generated on the rising and falling edges of the train of voltage cycles applied to the driven electrode $X^1$. The driven electrode $X^1$ and the sense electrode are assumed to act as opposing plates of a capacitor having a capacitance $C_E$. Because the sense electrode is capacitively coupled to the driven electrode $X^1$, it receives or sinks the changing electric field generated by the driven column electrode. This results in a current flow in the sense electrode induced by the changing voltage on the driven electrode $X^1$ through capacitive differentiation of the changing electric fields. The current will flow towards (or from, depending on polarity) the sense channel S in the sense unit 8. As noted above, the sense channel may comprise a charge measurement circuit configured to measure the flow of charge into/out of (depending on polarity) the sense channel caused by the currents induced in the sense electrode.

The capacitive differentiation occurs through the equation governing current flow through a capacitor, namely:

$$I_E = C_E \times \frac{dV}{dt}$$

where $I_E$ is the instantaneous current flowing to the sense channel S and dV/dt is the rate of change of voltage applied to the driven electrode $X^1$. The amount of charge coupled to the sense electrode (and so into/out of the sense channel S) during an edge transition is the integral of the above equation over time, i.e.

$$Q_E = C_E \times V.$$

The charge coupled on each transition, $Q_E$, is independent of the rise time of V (i.e. dV/dt) and depends only on the voltage swing at the driven electrode (which may readily be fixed) and the magnitude of the coupling capacitance $C_E$ between the driven electrode and sense electrode. Thus a determination of the charge coupled into/out of charge detector comprising the sense channel S in response to changes in the drive signal applied to the driven electrode $X^1$ is a measure of the coupling capacitance $C_E$ between the driven electrode $X^1$ and the sense electrode.

The capacitance of a conventional parallel plate capacitor is almost independent of the electrical properties of the region outside of the space between the plates (at least for plates that are large in extent compared to their separation). However, for a capacitor comprising neighbouring electrodes in a plane (i.e. neighbouring drive and sense elements which are on the same side of the substrate as for the sensor in FIG. 4 for both the column and row electrodes and the sensor in FIG. 3C for the row electrodes), or for neighbouring drive and sense elements on opposing sides of the substrate but offset from one another (i.e. not, or only slightly, overlapping in projection) as for the sensor in FIG. 3C for the column electrodes, this is not the case. This is because at least some of the electric fields connecting between the driven electrode and the sense electrode "spill" out from the substrate. This means the capacitive coupling (i.e. the magnitude of $C_E$) between the driven electrode and the sense electrode is to some extent sensitive to the electrical properties of the region in the vicinity of the electrodes in to which the "spilled" electric field extends.

In the absence of any adjacent objects, the magnitude of $C_E$ is determined primarily by the geometry of the electrodes, and the thickness and dielectric constant of the sensor substrate (especially in two-sided sensors such as in FIG. 3C). However, if an object is present in the region into which the electric field spills outside of the substrate, the electric field in this region may be modified by the electrical properties of the object. This causes the capacitive coupling between the electrodes to change, and thus the measured charge coupled into/ from the charge detector comprising the sense channel changes. For example, if a user places a finger in the region of space occupied by some of the spilled electric fields, the capacitive coupling of charge between the electrodes will be reduced because the user will have a substantial capacitance to ground (or other nearby structures whose path will complete to the ground reference potential of the circuitry controlling the sense elements). This reduced coupling occurs because the spilled electric field which is normally coupled between the driven column electrode and sense row electrode is in part diverted away from the row electrode to earth. This is because the object adjacent the sensor acts to shunt electric fields away from the direct coupling between the electrodes.

Figure 6A:
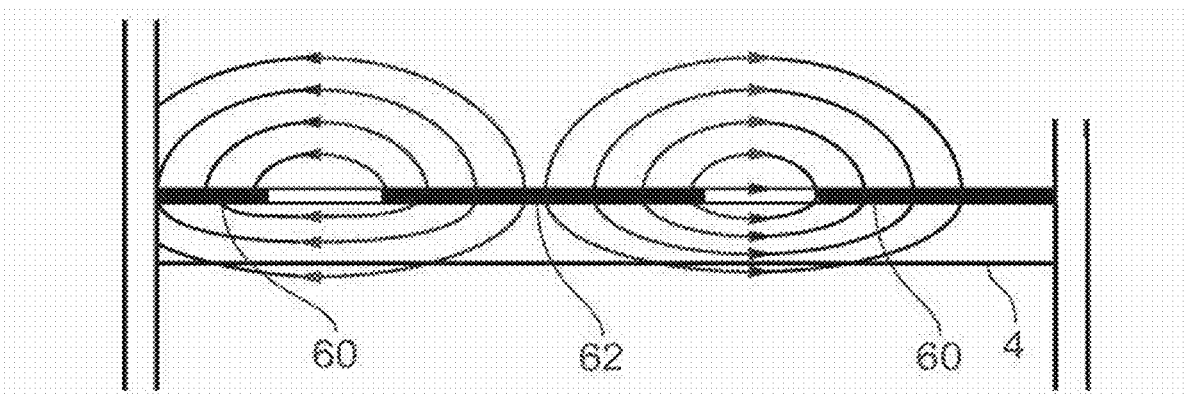
FIGS. 6A and 6B schematically show section views of a portion of the sensor shown in FIG. 4 with overlaying electric field lines.
Figure 6B:
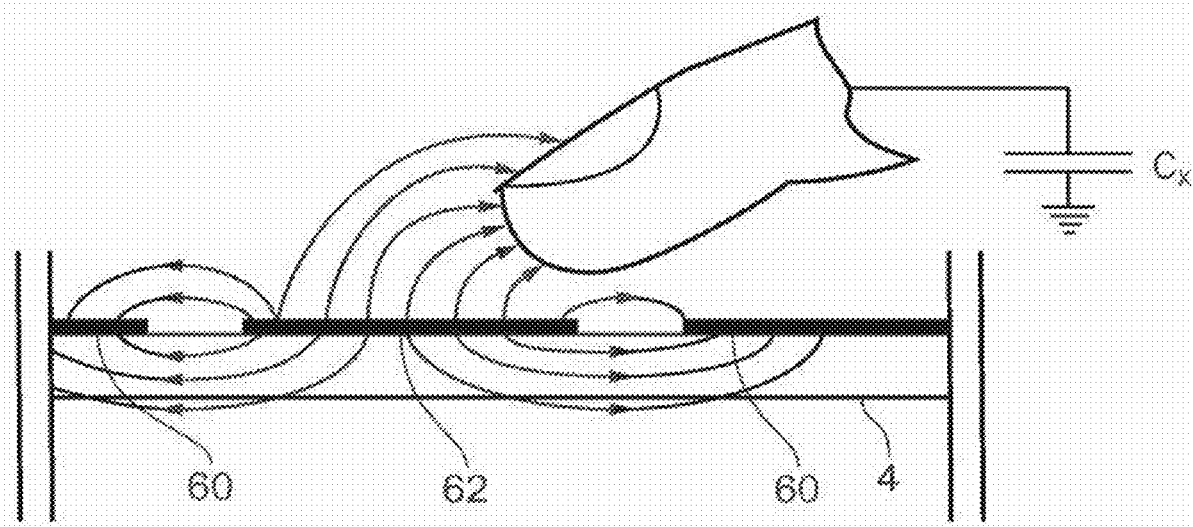

FIGS. 6A and 6B schematically show section views of a region of the sensor 2 shown in FIGS. 2 and 4 in which the electric field lines connecting between example drive and sense elements are schematically shown. Thus in FIGS. 6A and 6B a section of the substrate 4 is shown with an example drive element 62 and two neighbouring sense elements 60.

FIG. 6A schematically shows the electric fields when the electrode comprising the drive element 62 shown in the figure is being driven, and there is no object adjacent the sensor. FIG. 6B shows the electric fields when there is an object adjacent the sensor (i.e. user's finger having a capacitance $C_x$ to ground). When there is no object adjacent the sensor, all of the electric field lines connect between the driven element 62 and one or other of the sense elements 60. However, when the user's finger is adjacent the sensor, some of the electric field lines that pass outside of the substrate are coupled to ground through the finger. Thus fewer field lines connect between the driven and sense elements and the capacitive coupling between them is accordingly reduced.

Thus by monitoring the amount of charge coupled between the driven electrode and the sense electrode, changes in the amount of charge coupled between them can be identified and used to determine if an object is adjacent the sensor (i.e. whether the electrical properties of the region into which the spilled electric fields extend have changed).

Figure 7A:
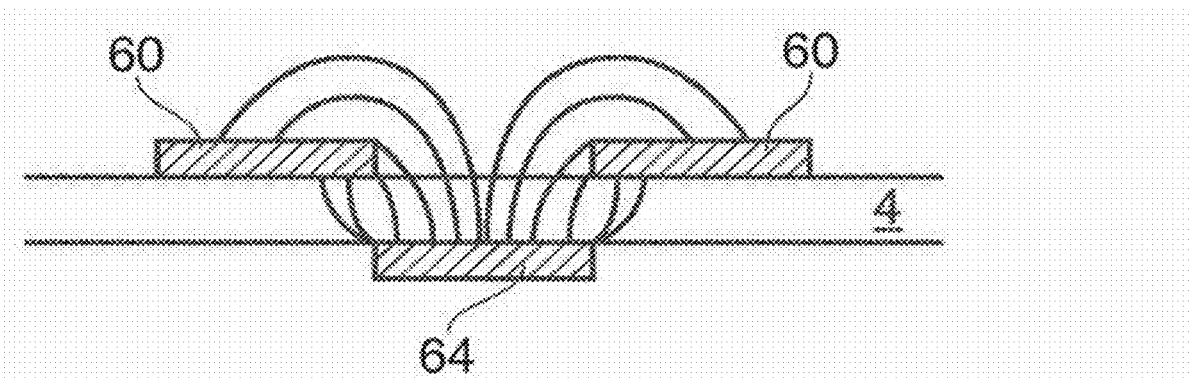
FIGS. 7A and 7B schematically show section views of a portion of the sensor shown in FIG. 3C with overlaying electric field lines.
Figure 7B:
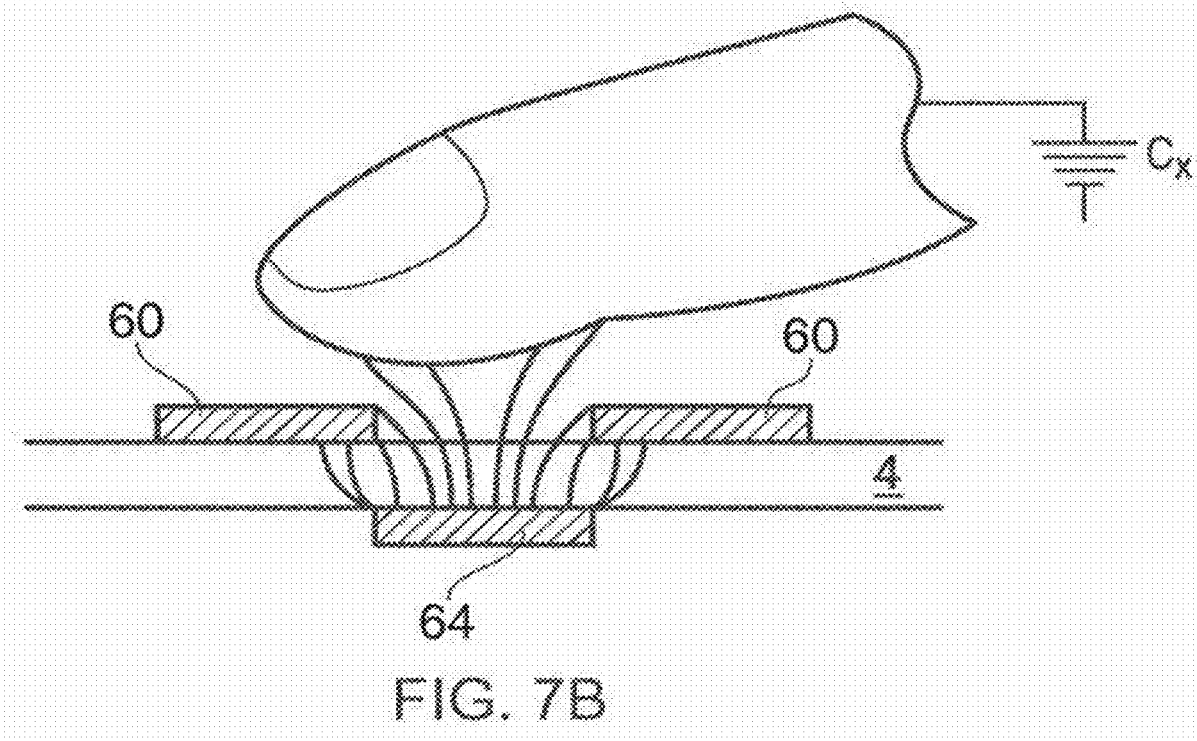
Figure 8A:
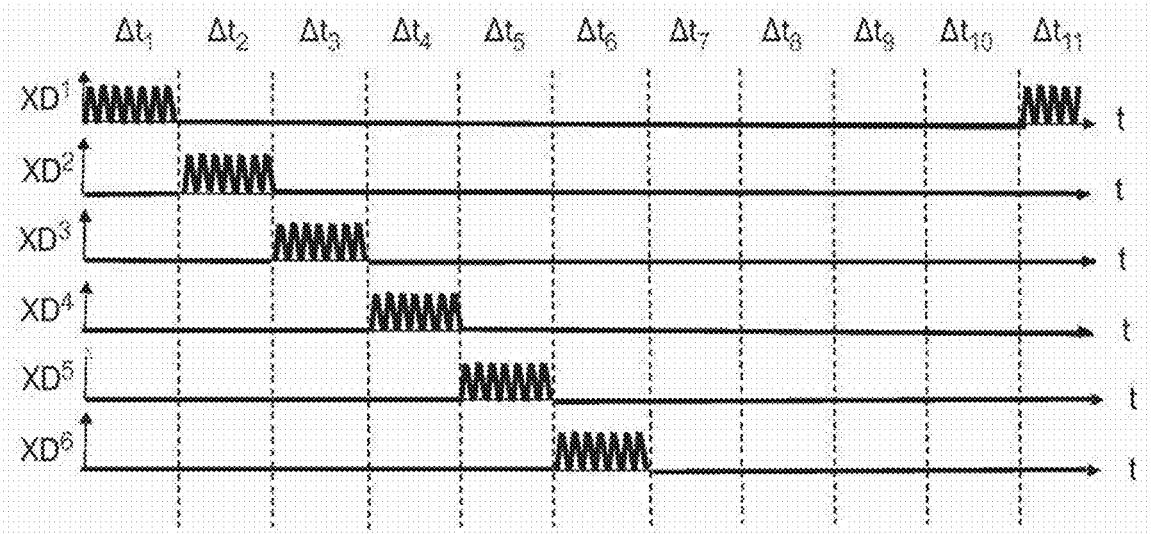
FIG. 8A schematically shows a sequence of drive signals applied to the row electrodes of the sensor shown in FIG. 4.
Figure 8B:
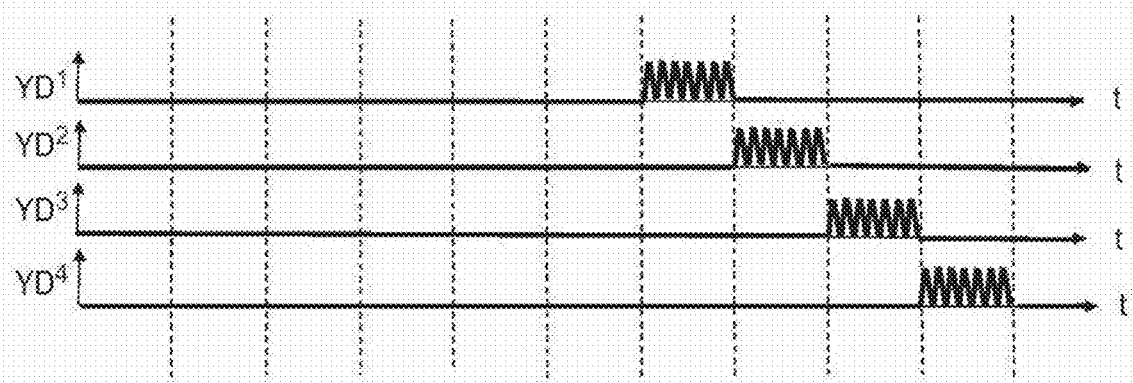
FIG. 8B schematically shows a sequence of drive signals applied to the column electrodes of the sensor shown in FIG. 4.
Figure 8C:
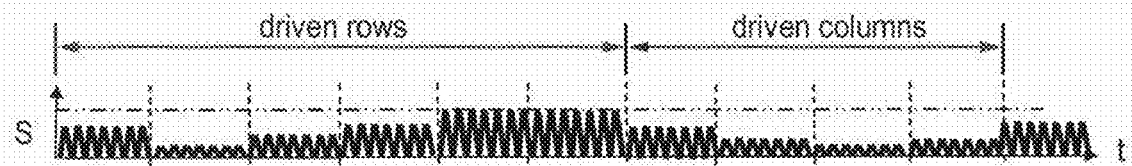
FIG. 8C schematically shows the magnitude of a component of the respective drive signals shown in FIGS. 8A and 8B which is coupled to the sense electrode during a measurement cycle using the sensor of FIG. 4.

(For completeness, FIGS. 7A and 7B schematically show section views of a region of the sensor 32 shown in FIGS. 3A to 3C in which the electric field lines connecting between example drive and sense elements on opposing sides of the sensor substrate are schematically shown. Thus in FIGS. 7A and 7B a section of the substrate 4 is shown with an example drive element 64 and two neighbouring sense elements 60. Comparison of FIGS. 7A and 7B shows how the presence of the user's finger reduces the capacitive coupling between the drive and sense elements.)

Thus in use the drive channels $XD^1$, $XD^2$, $XD^3$, $XD^4$, $XD^5$, $XD^6$, $YD^1$, $YD^2$, $YD^3$ and $YD^4$ are driven in turn while the sense channel is monitored.

In time bin $\Delta t_1$, a relatively large signal is seen at the sense channel. This is because the capacitive coupling between the row electrode $X^1$ being driven in this time bin, and the sense elements of the sense electrode adjacent the drive elements of this row electrode is relatively undisturbed by the presence of the finger. I.e. the coupling is more like that shown in FIG. 6A than FIG. 6B.

In time bin $\Delta t_2$, on the other hand, a weaker signal is seen at the sense channel. This is because the capacitive coupling between the row electrode $X^2$ and the sense elements of the sense electrode adjacent this row electrode is more strongly disturbed by the presence of the finger because the finger is near to row electrode $X^2$. I.e. the coupling is more like that shown in FIG. 6B than FIG. 6A.

In time bin $\Delta t_3$, a comparable, although slightly stronger signal is seen at the sense channel than is seen in time bin $\Delta t_2$. This is because the capacitive coupling between the row electrode $X^3$ and the sense elements of the sense electrode adjacent this row electrode is similarly disturbed by the presence of the finger, although here it is considered that the finger centroid is closer to the centre of row $X^2$ than it is to row $X^3$, and hence row $X^3$ is slightly less affected.

In time bin $\Delta t_4$, the signal seen at the sense channel is comparable to that seen in time bin $\Delta t_1$. This is because the capacitive coupling between the row electrode $X^4$ and the sense elements of the sense electrode adjacent this row electrode are similarly disturbed by the presence of the finger for rows $X^1$ and $X^4$.

The sense channel signal in time bins $\Delta t_5$ and $\Delta t_6$ is larger still since these rows are sufficiently far from the finger location that they are unaffected by it and the capacitive coupling is relatively strong, as shown in FIG. 6A.

The relative sense signals seen in time bins $\Delta t_1$ to $\Delta t_6$ (corresponding to row electrodes $X^1$ to $X^6$ being sequentially activated) therefore allow the position of the finger in a direction orthogonal to the rows to be determined. I.e. the centroid of the finger can be determined from the location of the minimum signal seen in the sense channel. For example, the sense channel signals for each row may be plotted as a function of the central position of the row along a direction orthogonal to the extent of the rows, and a curve fitted to the plot. The location of the minimum corresponds with the calculated position of the object in a direction orthogonal to the extent of the rows—i.e. in a y-direction if the rows are considered to extend in an x-direction. This approach provide for interpolation between the rows so that position can be determined to a precisions better than that the width of the rows. Thus in this case a y-position of around midway between rows $X^2$ and $X^3$ may be determined (though slightly closer to the mid-point of row $X^2$ since row $X^2$ is associated with a slightly lower signal).

A similar analysis of the sense signals seen in time bins $\Delta t_7$ to $\Delta t_{10}$ during which column electrodes $Y^1$ to $Y^4$ are sequentially activated allows a position to be determined in direction orthogonal to the extent of the column electrodes—i.e. an x-position in this example. Thus in this example an x-position of around midway between columns $Y^2$ and $Y^3$ may be determined (though slightly closer to the mid-point of row $Y^3$ since row $Y^3$ is associated with a slightly lower signal than row $Y^2$).

In this example, the position of a single touch location is determined. However, cases where there are two touches (e.g. a user indicating two-positions using two separate fingers) may also be identified. For example, a plot of sense signal strength versus drive row showing two minima will indicate two touch locations at the respective minima locations in the y-direction. The x-direction of the multi-touches will be apparent from the corresponding minima locations in a plot of sense signal strength versus drive column electrode for the same measurement cycle (only one minimum in this plot would suggest the two touches were at the same x-position (i.e. over the same column).

Thus, by sequentially scanning the row and column electrodes while continuously monitoring the sense electrode, an x- and a y-position (or multiple x- and y-positions) can be determined.

It will be appreciated that the specific patterns shown in FIGS. 2 to 4 are only two particular examples of this type of electrode patterning and similar patterns based on, for example, circular or square drive and sense elements, and many other configurations can equally be used.

FIG. 9 schematically shows in plan view a control panel 80 incorporating a touch sensitive position sensor 82 of the kind described shown in FIG. 4. The control panel 80 is mounted in a wall 84 of a device being controlled, in this case a washing machine. The position sensor is located beneath a cover panel 92 and overlies an underlying LCD display screen. The control panel is thus a touch-sensitive display. The LCD display in this example extends over the whole area of the control panel 80 with the region occupied by the position sensor located, in this example, near to the middle of the control panel. The touch sensitive display is shown in FIG. 9 with a display that shows a number of menu buttons labelled A to F, e.g. corresponding to different washing programs that may be selected, a sliding scale 94 for defining a variable parameter, e.g. a washing temperature, and some lines of text 96 displayed to a user for information. Thus a user may, for example, select a washing program by touching the control panel in the region of the menu buttons labelled A to F. The sensor comprising the touch sensitive display may be configured such that the positions of the menu buttons A-F correspond to the locations of virtual "keys" in the sensor whereby the position of a touch within the sensitive area may be determined from an interpolation of the sense signals from the various row and column electrodes, the position then being compared with the positions of the displayed menu buttons to determine if one has been selected. A selection of a temperature from the sliding temperature scale 82 displayed to a user can be made in the same way.

In addition to the touch sensitive display 82, the control panel also includes a number of additional buttons 86 and an on/off switch 88. These may be touch sensitive keys or conventional mechanical button switches. In this example they are touch sensitive keys which preserve the flat and sealed outer surface of the control panel. Because in this case the additional buttons are not required to be transparent, there is no need for them to be formed from ITO. Accordingly, cheaper and less resistive copper electrodes may be used for these buttons. Furthermore, a single sensor controller integrated circuit chip may conveniently be used to control the position sensor comprising the transparent sensor and the more convention copper electrode touch sensitive buttons 86, 88. This can be achieved, for example, by appropriate calibration of the different channels of the single controller chip to take account of the different resistance and loading of the ITO film of the position sensor 2 and the copper electrodes of the other buttons.

Thus a designer is afforded a great deal of freedom in designing a control panel incorporating a touch sensitive position sensor and it will be appreciated that the principles described above are applicable to many types of device/appliance. For example, similar sensors can be used with ovens, grills, washing machines, tumble-dryers, dish-washers, microwave ovens, food blenders, bread makers, drinks machines, computers, home audiovisual equipment, portable media players, PDAs, cell phones, computers, and so forth. For example, FIG. 10 schematically shows a washing machine 91 incorporating a sensor 93 according to an embodiment of the invention and FIG. 11 schematically shows a cellular telephone 95 incorporating a sensor 99 according to an embodiment of the invention and a screen 97. More generally the invention may be used in conjunction with any appliance having a human-machine interface. It is also possible to provide a sensor similar to the kinds described above which is provided separately from a device/appliance which it may be used to control. For example to provide an upgrade to a pre-existing appliance. It is also possible to provide a generic sensor which may be configured to operate a range of different appliances. For example, a sensor having a given range of virtual keys which a device/appliance provider may associate with functions of an apparatus as he wishes by appropriately configuring a controller, for example, by reprogramming.

It will be appreciated that 2DCTs embodying the invention may incorporate a variety of additional features. For example, in some applications it is desirable to have a 'wakeup' function, whereby the entire device 'sleeps' or is in some quiescent or background state. In such cases, it is often desirable to have a wake signal from mere proximity of a human body part some distance away. The element can be driven as a single large capacitive electrode without regard to position location, while the unit is in the background state. During this state the electronic driver logic looks for a very small change in signal, not necessarily enough to process as a 2D coordinate, but enough to determine that an object or human is in proximity. The electronics then 'wakes up' the overall system and the element is driven so as to become a true 2DCT once again.

Thus there has been described a sensor for determining a position for an adjacent object in two dimensions. The sensor comprises a substrate with a sensitive area defined by a pattern of electrodes, wherein the pattern of electrodes includes a first group of drive elements interconnected to form a plurality of row electrodes extending along a first direction, a second group of drive elements interconnected to form a plurality of column electrodes extending along a second direction, and a group of sense elements interconnected to form a sense electrode extending along both the first and second directions. The sensor further comprises a controller comprising a drive unit for applying drive signals to the row and column electrodes, and a sense unit for measuring sense signals representing a degree of coupling of the drive signals applied to the row and column electrodes to the sense electrode. Thus a 2D position sensor requiring only a single sense channel is provided.

What is claimed is:

1. A sensor comprising:
   a substrate with a sensitive area defined by a pattern of electrodes, wherein the pattern of electrodes includes:
   a first group of drive elements interconnected to form a plurality of row electrodes extending along a first direction;
   a second group of drive elements interconnected to form a plurality of column electrodes extending along a second direction; and
   a group of sense elements interconnected to form a sense electrode extending along both the first and second directions, wherein the drive elements in a column or row are interconnected to each other by connection traces.

2. A sensor according to claim 1, wherein the sensor further comprises a controller comprising a drive unit for applying drive signals to the row and column electrodes, and a sense unit for measuring sense signals representing a degree of coupling of the drive signals applied to the row and column electrodes to the sense electrode.

3. A sensor according to claim 1, wherein the controller further comprises a processing unit for calculating a position for an object in one direction from an analysis of the sense signals obtained by applying drive signals to different ones of the row electrodes, and calculating a position for the object in another direction from an analysis of the sense signals obtained by applying drive signals to different ones of the column electrodes.

4. A sensor according to claim 1, wherein the first group of drive elements and the second group of drive elements are located on opposite sides of the substrate.

5. A sensor according to claim 1, wherein the first group of drive elements and the second group of drive elements are located on opposite side of the substrate.

6. A sensor according to claim 5, wherein connections for connecting the first group of drive elements into the row electrodes are made within the sensitive area of the sensor and connections for connecting the second group of drive elements into the column electrodes are made at least partially outside of the sensitive area of the sensor.

7. A sensor according to claim 6, wherein the connections for connecting the second group of drive elements into the column electrodes include connection portions within the sensitive area of the sensor which extend in the same direction as the row electrodes from respective ones of the drive elements to a periphery of the sensitive area of the sensor.

8. A sensor according to claim 6, wherein drive elements in at least one of the column electrodes include passageways to allow connections from drive elements in another column electrode to pass through.

9. A sensor according to claim 8, wherein portions of drive elements on either side of the passageways are connected together by connections made at least partially outside of the sensitive area of the sensor.

10. A sensor according to claim 9, wherein the connections for connecting the portions of drive elements on either side of the passageways include connection portions within the sensitive area of the sensor which extend in the same direction as the row electrodes to a periphery of the sensitive area of the sensor.

11. A sensor according to claim 5, wherein the group of sense elements are located on the same side of the substrate as the first and second groups of drive elements.

12. A sensor according to claim 11, wherein connections for connecting the sense elements into the sense electrode are made at least partially outside of the sensitive area of the sensor.

13. A sensor according to claim 12, wherein the connections for connecting the sense elements into the sense electrode include connection portions within the sensitive area of the sensor which extend in the same direction as the row electrodes from respective ones of the sense elements to a periphery of the sensitive area of the sensor.

14. A sensor according to claim 6, wherein at least one of the sense elements includes a passageway to allow connections from drive elements in a column electrode to pass through.

15. A sensor according to claim 14, wherein portions of the at least one of the sense elements on either side of the passageway are connected together by connections made at least partially outside of the sensitive area of the sensor.

16. A sensor according to claim 15, wherein the connections for connecting the portions of the at least one of the sense elements on either side of the passageway including connection portions within the sensitive area of the sensor which extend in the same direction as the row electrodes to a periphery of the sensitive area of the sensor.

17. A sensor according to claim 1, wherein the row electrodes and the column electrodes are orthogonal to one another.

18. The sensor of claim 1 wherein the drive elements and sense elements are formed as columns of alternating sense and drive elements.

19. The sensor of claim 1 wherein the drive elements are formed of a transparent material.

20. The sensor of claim 1 wherein the drive elements, sense elements, and substrate are formed of a transparent material.

21. The sensor of claim 1 wherein drive elements are located adjacent to and between respective ones of the sense elements such that the elements do not overlap.

22. A sensor comprising:
   a substrate having associated patterns of electrodes, wherein the patterns of electrodes include:
      a first group of discrete drive elements selectively interconnected to form a plurality of independently drivable rows electrodes extending along a first direction;
      a second group of discrete drive elements selectively interconnected to form a plurality of independently drivable column electrodes extending along a second direction;
      a group of sense elements interconnected to form a sense electrode extending along both the first and second directions; and
      wherein the drive and sense elements are formed as conductive geometric shapes selectively interconnected by conductive traces.

23. The sensor of claim 22 wherein the sense elements are generally circular in shape.

* * * * *